March 4, 1958  M. N. MUSGRAVE  2,825,454
DEVICES FOR SEPARATING RAISINS FROM ADMIXED STEMS
Filed Sept. 10, 1954  3 Sheets-Sheet 1

INVENTOR.
MERRILL N. MUSGRAVE
BY
Reynolds, Beach & Christensen
ATTORNEYS

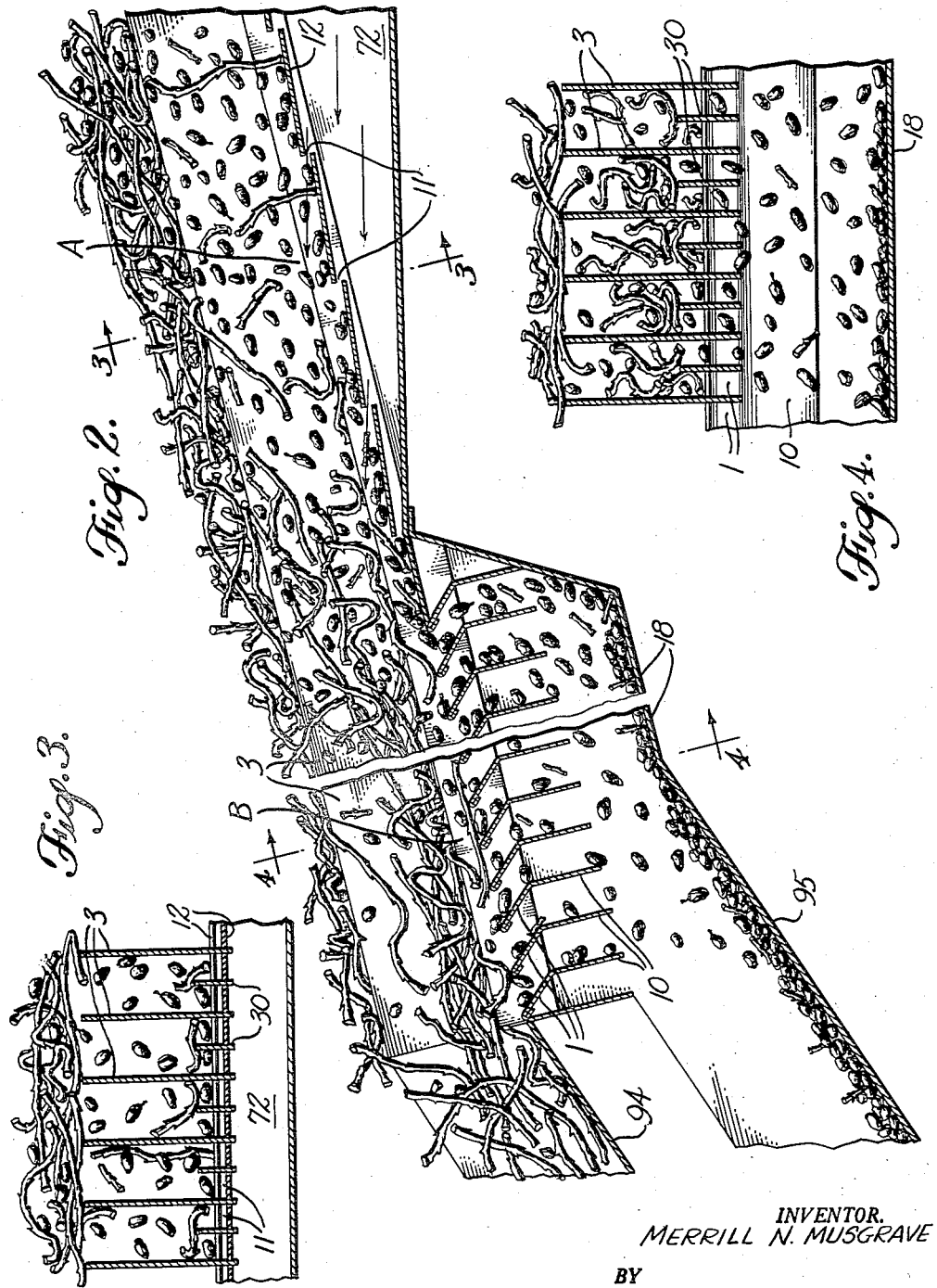

INVENTOR.
MERRILL N. MUSGRAVE
BY
Reynolds, Beach + Christensen
ATTORNEYS

United States Patent Office 2,825,454
Patented Mar. 4, 1958

2,825,454

DEVICES FOR SEPARATING RAISINS FROM ADMIXED STEMS

Merrill N. Musgrave, Seattle, Wash.

Application September 10, 1954, Serial No. 455,105

9 Claims. (Cl. 209—12)

This device is for the specific purpose of separating loose raisins from the stems with which they are admixed, and so recovering a valuable product, the raisins, in rather large quantities from a hitherto waste product of low value, the stems, without materially lessening the value of the stem residue.

After raisins have been dried, in clusters just as they were picked from the vine, they are processed by machine to pull them from the stems. Some eighty percent of the raisins are thus separated and recovered, but the other twenty percent, although pulled loose, remain admixed with the entangled stems. These stems are mostly long, as will be explained hereinafter, extremely and irregularly crooked and barbed, and dried out and tough. A mass of such stems, intertwined and interhooked by their barbs, constitutes a mesh which cannot readily be torn, shaken, nor blown apart, within which the raisins remain trapped.

These raisins are of quality equal to those initially recovered, selling currently in the vicinity of $120 to $160 a ton, yet because no commercially practicable way has been discovered heretofore for separating them from the stems, this mixture is ordinarily sold as cattle feed at about $16 a ton, or for the manufacture of alcohol at perhaps $50 a ton, in either case far below the value of the raisins which make up the greater weight of the mixture. It can be realized that sales for such purposes, and at such reduced prices, of twenty percent of the crop represent a large economic loss.

The present invention operates on this mass of admixed stems and loose raisins, and by loosening the mass and rearranging the stems the raisins are freed. They drop down below the stems, and provision is made for their escape by a screening operation. By other provisions the escape of the stems, and their matting up again to block escape of the raisins, are prevented. Eventually the stems are collected, quite largely freed of their burden of raisins, and are just as valuable for cattle feed as was the original mixture, especially so since the stems are palatable and nutritious to cattle, and a ton of the lighter stems bulks larger than a ton of the mixture.

It should be made clear that in speaking of stems herein the reference is not to the tiny cap stem so often left on individual raisins. It is not the function of this invention to remove such cap stems. Furthermore, there is a way known by which they can be removed after the raisins are separated from the main stems, and in any event their presence does not in any way constitute a problem, nor aggravate particularly the problem with which this invention deals. Rather the stems referred to herein are the long, crooked, tough and barbed stems which result from the drying of the main stems and principal branch stems of the cluster.

Because certain dimensions, spacing and space relationships in the machine of this invention are necessarily related to the sizes of the raisins and of the stems and the general shape of the latter, it will be helpful at this point to describe in some detail the raisins and stems in typical varieties with which such a machine will deal. Of the main stems and principal branch stems that constitute by far the greater part of the mass, many are four or five inches long, and some are even longer. Most of them are over three inches long. Some few are no more than two inches long, and a very few are short fragments of stems in the neighborhood of an inch long. The longer they are, the more crooked they are likely to be, and the more barbs they will have, usually, where individual cap stems have been torn off. The raisins, on the other hand, run up to about five-eighths inch in length, although it will be understood that many are appreciably smaller.

The present invention provides a screen apertured for the passage of raisins up to the size indicated, but not appreciably larger. If the apertures in the screen are no greater than about five-eighths inch in their greatest dimension it will be evident that the only way in which a stem of greater length can pass through the same aperture is by entering it endwise. If the presentation of the ends of stems to the screen apertures can be prevented, and if the mass can be loosened sufficiently to disengage the raisins, it will be obvious that the raisins can drop through the screen but the stems cannot. This invention precludes endwise presentation of stems to the screen apertures, and loosens the mass to permit raisins to drop out of the mass. It will not prevent occasional short stems, up to an inch or so in length, from dropping through with the raisins occasionally, but these present no particular problem and can readily be separated from the segregated raisins by a subsequent operation. Thus it can be seen that this invention deals with an intermediate operation, intermediate the first operation of pulling the raisins from the stems, and the final operation, the separation of the very shortest stems from the separated raisins. This intermediate step is one which has heretofore been incapable of accomplishment, and serves to increase the net yield of an important crop, and to avoid an appreciably large economic loss.

As has been explained, the stems with which this invention deals are very crooked, stiff, tough and have many barbs where the cap stem or branch stems have pulled away from the main stems or branches. These stems, thrown in a helter-skelter mass, become greatly entangled. The barbs and crooks strongly resist disengagement of one stem from another by all methods commercially feasible and tried heretofore. So long as they remain thus entangled the raisins which become entangled in the mass are held locked therein, and cannot escape.

The first objective of this invention, therefore, is to disentangle the stems (which per se is not unduly difficult) and to prevent their tangling again, so that the raisins may fall free and will not again be trapped, but can be collected and separated from the stems by an operation akin to screening. The second objective, equally important, and which has heretofore been the one most difficult of accomplishment, is to prevent numerous individual stems from dropping out of the mass and being screened out with the raisins, or from starting through the screen but becoming entangled therein, and so clogging the screen. Such clogging would occur by reason of a stem catching while part way through the screen to block the screen aperture it occupies, and by a caught stem becoming entangled with additional stems, and so blocking additional apertures, and eventually preventing further feed of the mass along the screen. Obviously, it helps none to shake the mass apart, if the stems can not then be separated from and prevented from rejoining the raisins, or if the stems jam the machine.

Enough has been said to indicate the general nature and effect of this invention, and these will be better understood from this specification as it progresses and from the claims in conjunction with the accompanying drawings. The invention claimed resides in the machine for carrying out the method described hereinbelow.

The drawings illustrate the machine somewhat diagrammatically.

Figure 2 is an enlarged sectional view lengthwise of the direction of advance along a single channel of such a machine, illustrating primarily the initial and the final portions of that channel.

Figure 3 is a transverse sectional view on the line 3—3 of Figure 2, and Figure 4 is a similar sectional view on the line 4—4 of that same figure.

Figure 1:
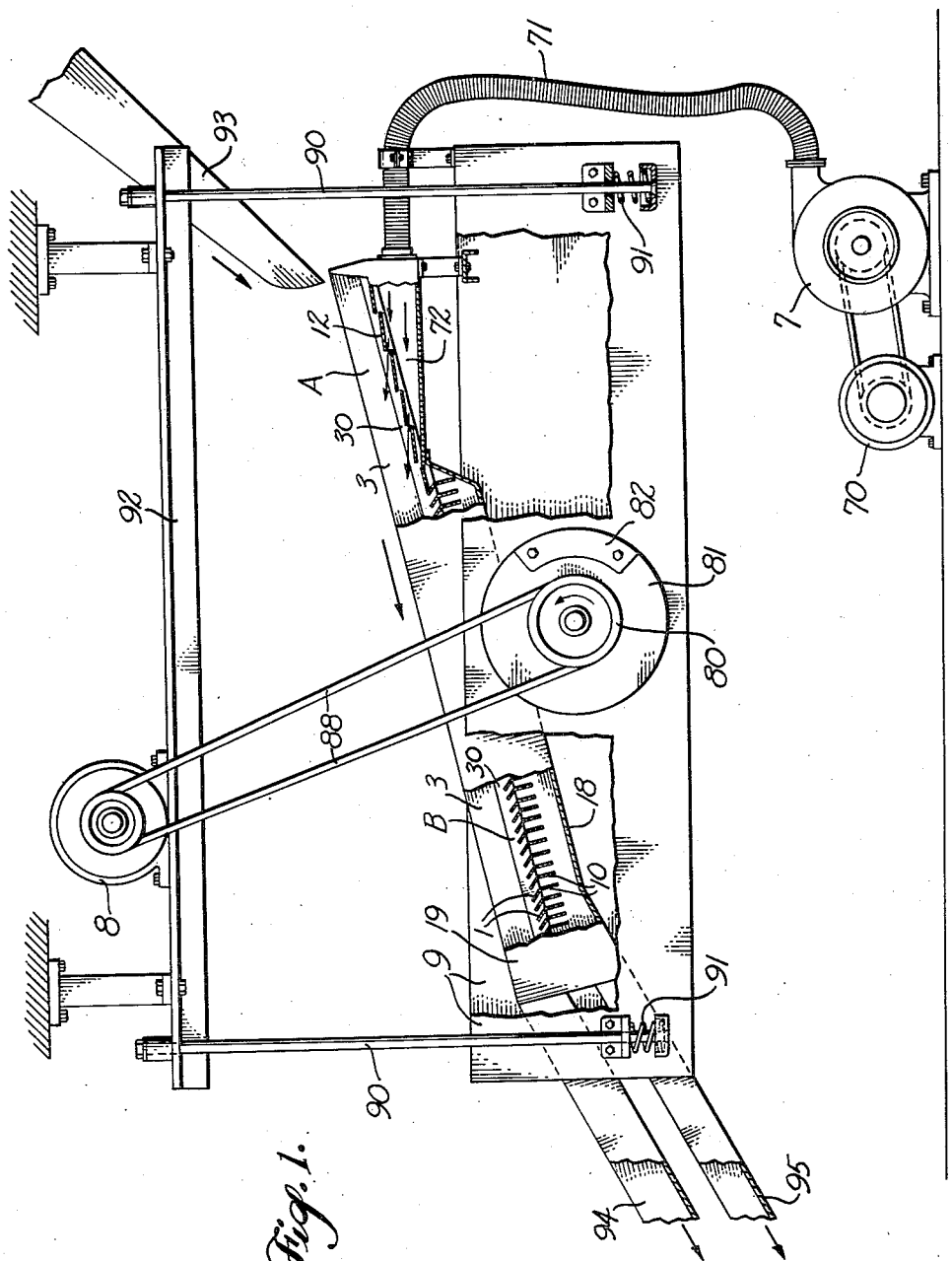
Figure 1 is a general side elevational view, with parts somewhat diagrammatically shown and broken away in part, of the entire machine in a representative gravity feed form.

According to the present invention the mass of stems and raisins is deposited upon the upper edges of a series of parallel ridges. The strips or blades which define these ridges are spaced apart by a distance which exceeds the greatest dimension of the largest raisins, but which is much less than the length of the majority of stems. Provision is made for advancing the deposited mass along the ridges, and meanwhile the ridges and the stems thereon are vibrated or otherwise agitated to shake the mass apart. The feed may be accomplished by gravity or by positive feed means. The first effect of the vibration during their advance is to shake loose some of the stems and to cause these stems to drop down into the channels between ridges. The provision is made for limiting their dropping and for causing the stems, as they continue to advance, to align themselves generally in the direction of their advance, and to insure that they are not pointed downwardly. Raisins which drop out at the same time are also caught and caused to advance to a further point where they may be discharged through the screen. By the time the stems reach the raisin-escape apertures the stems have been aligned in the direction of advance, and the raisin-escape apertures are of such construction, and so arranged, that the stems, when arranged as described, will of necessity ride on past the apertures rather than engaging therein.

In the alignment of the stems the fact that the spacing between the ridges is materially less than the length of most of the stems is of material importance. This prevents any stems from dropping down into the channels between the ridges while oriented in any direction except parallel with the ridges and the ridge-forming elements. Furthermore, though they may initially drop down into the interridge channels with their ends directed primarily downwardly, the provision of means to cause the stems to align themselves with the direction of advance, while they advance through this initial portion of their advance, insures that there will be no downwardly projecting stems to enter the raisin-escape aperture which the stems encounter in common with the raisins, subsequently.

The nature and disposition of the elements which form the raisin-escape apertures are likewise important. These are arranged in the form of parallel louvers disposed transversely of the direction of advance, and constituting as a whole a bottom area of the screen. The raisins roll down onto these louvers, or are advanced until they reach the louver apertures. These louver-forming elements are inclined reversely to the direction of advance, whereby the raisins, even though they may be rolling down the screen, if the latter is inclined, will reverse direction and exit through the louvers, whereas the stems will merely ride over the inclined louvers and not engage therewith nor hang up. Moreover, the spacing between the louver elements is only sufficient to pass the largest of the raisins, and quite insufficient to permit passage of the long, crooked stems. A few of the very shortest stems may reverse direction and fall out with the raisins, but their subsequent separation by a further process constitutes no particular problem.

The machine of this invention, in a representative form shown in Figure 1, includes a shaking frame which has two vertically disposed side plates 9 of adequate mass, suspended at their ends by rods 90 and spring means 91 from a fixed framework, indicated typically at 92. A motor 8 drives pulleys 80 at opposite sides of the vibrating frame through a belt 88, to rotate wheels 81 provided with unbalanced weight masses 82, to effect vibration of the frame. By changing the weight mass the amplitude at any given rate of drive may be varied, in known manner. The sense of rotation of the wheels 81 should be counterclockwise, as viewed in Figure 1, for reverse rotation tends to hold back the mass, or even to feed it upwardly.

A feed chute 93 delivers the mixed raisins and stems to be processed onto one end of a screen, such as will be described in detail shortly, and at the opposite, discharge end of the screen the stems are delivered to a stem delivery chute 94, and the separated raisins to a raisin delivery chute 95. For a purpose which will appear shortly, and optionally, a blower or fan 7, driven by a motor 70, delivers air by means of a duct 71 to a plenum chamber 72 which is incorporated in the vibrating screen, below a portion of its bottom.

The side flanges of the screen are indicated at 19, and its bottom is divided into two bottom areas, an initially encountered area generally indicated at A and a subsequently encountered area generally indicated at B. For convenience, considering the screen to be inclined as in Figure 1 for gravity advance, these may be termed, respectively, the upper and the lower area. The upper area may be solid, or may have slits for air jets issuing from the plenum chamber 72, but primarily the upper bottom area A may be considered as substantially imperforate. The lower bottom area B, however, is constituted primarily by louvers of a particular form, through which raisins pass by gravity to drop upon a pan 18, which constitutes part of the screen, and which leads to the raisin delivery chute 95. It will be clear from the drawings that the bottom area A constitutes only a small portion of the entire bottom area, and that the bottom area B constitutes by far the major portion of the bottom area of the screen. The only reason the louvers do not constitute the entire bottom area is that the drag of any downwardly pointed stems on the substantially imperforate bottom area A is relied upon to deflect these stems, so that they will ride over the louvers of the area B when they reach this part of the screen.

The louvers in the bottom area B are constituted by parallel transversely directed blades, the upper edge surfaces of which, indicated at 1, are inclined at an angle to the direction of advance down the screen, and are spaced apart by a distance not much in excess of the longest dimension of the largest raisins which are to be processed. The lower portions of the louvers, indicated at 10, may be generally upright, that is, generally normal to the plane of the screen as a whole. However, the inclination of the louvers' upper edges 1 is such as to constitute a slope reverse to the direction of advance, and reverse to the slope of the screen as a whole, if the same is inclined as in the Figure 1 form, and in the latter case the lower portions 10 are also somewhat sloped reversely to the direction of advance. The upper edges of the louver portions 1 are preferably turned over to eliminate any sharp edge which might catch a barb, and so cause a stem to be halted.

The upper bottom section A may be slightly slit, as indicated at 11, to provide surfaces 12 intermediate the slits which are slightly sloped, but which brush passing downwardly directed stem ends, and which collectively constitute a nearly imperforate bottom. The brushing urges stems into parallelism with the direction of advance, before they reach the lowered bottom area B. The use of the air jets at 11 is optional, but it is believed that their use will be of assistance in advancing the mass.

Since, as has been stated above, the spacing between the louver elements 1 is not greatly in excess of the longest dimension of the largest raisins being processed, perhaps five-eighths inch, it is evident that these louver spaces are far too small to encourage or even to permit the crooked three-, four- or five-inch stems to pass backwardly through them, and even should an occasional short stem pass backwardly through them as do the raisins, these small stem fragments are easily eliminated subsequently from the raisins, as they have no appreciable tendency to cling together in a matted mass.

The screen includes longitudinally directed ridges 3, which intersect the louvers 1 and the surfaces 12, and extend longitudinally in the direction of advance; they are spaced apart transversely of that direction by a distance which is appreciably less than the length of the majority of the stems. Their spacing is perhaps one inch apart. They extend uninterruptedly along the bottom section A and the bottom section B as well. These ridges stand up above the bottom areas by an appreciable distance, perhaps three inches, so that stems which rest upon their upper edge, crosswise, are unlikely to extend so far down into the channels between these ridges as to contact the bottom, but rather leave a clear space beneath them, and between them and the bottom.

The function of these ridges, and the parallel channels which they define, is to channelize and effect rearrangement of the stems which are deposited in a helter-skelter mass upon the upper portion of the screen, so that by the time they travel to the discharge end of the screen, many, if not all, the stems have dropped down into the channels between adjacent ridges, and there have been rearranged from their initial helter-skelter disposition into a disposition wherein they lie generally parallel to and lengthwise of the direction of advance. Only in the process of such rearrangement, and after being thus rearranged, can the raisins drop relatively freely, and can the stems drop down to rest upon the bottom of the screen. When so rearranged the stems are directed transversely of the surfaces 12, and slide thereover and over the sloping louver surfaces 1 with practically no tendency to catch thereon or to halt their advance. They are interhooked one with another, so that they all slide together, but are not intermeshed appreciably, nor likely to act independently of the mass. Since the stems are so much longer than the space transversely between ridges 3, it is impossible for them to turn parallel to the louver spaces, so that they might drop down therebetween or catch therein.

Some of the shorter stems, those an inch or less in length, may turn crosswise and drop down. To minimize this it may be desirable to provide low ridge-forming elements 30 which hold some of the medium length stems from turning crosswise to any appreciable extent, which serve to channelize the short stems, and which, like the upper edges of the taller ridges 3, present edges along which stems may ride, leaving a somewhat clear space immediately beneath them into which the raisins may fall, and constitute in effect a tunnel through which they roll.

In operation the mass of raisins and stems is deposited by way of the feed chute 93 upon the upper portion of the screen, which is set into vibration by the motor 8 and its connected elements. As the vibration continues, the mass of stems and raisins tends to slide down along the upper edges of the ridges 3. Gradually the mass will shake apart, and first raisins, then stems, will begin to drop down into the channels between the ridges. As the mass shakes apart and stems drop down, more raisins will drop free from the mass. The raisins first separated will be deposited upon the substantially imperforate bottom portion A, and raisins later shaken free will be deposited upon the louvered bottom portion B. The lower intermediate ridge-forming elements 30 will halt the stems and support them above the level of the louvers, so as to leave a clear space into which the raisins may drop and down which they may roll, and will serve to channelize somewhat further the shortest stems. By the time the stems and raisins have reached the lower end of the screen most of the raisins will have been shaken free, and have been dropped or rolled down upon the louvered bottom portion, where they reverse their direction of movement, sliding down the sloped louver surface 1 to drop upon the pan 18, and so they reach the raisin discharge chute 95. The stems are carried on past the end of the screen, and are received in the stem discharge chute 94. By this process a very high percentage of the raisins which otherwise are unrecoverable are recovered, and after further cleaning can be sold at the same price as the raisins originally separated from the clusters.

Some of the very shortest of the stems will fall through the louver openings onto the pan 18. As has been stated, this is of no moment, since they are light, are largely free from barbs, cannot form a mass to enmesh the raisins, the more so as they are of small mass and bulk with relation to the recovered raisins. These short stems are readily separated from the raisins by a subsequent operation.

Air blasts through the jet openings at 11, if employed, will serve to advance the raisins, and any stems which have dropped down, down the slope until the raisins can drop through the louvered bottom area B, and the stems can be aligned with the direction of advance. To a certain extent also these jet openings may serve to advance all stems through the initial portion of the process, and assist in loosening the mixture.

Figure 5:
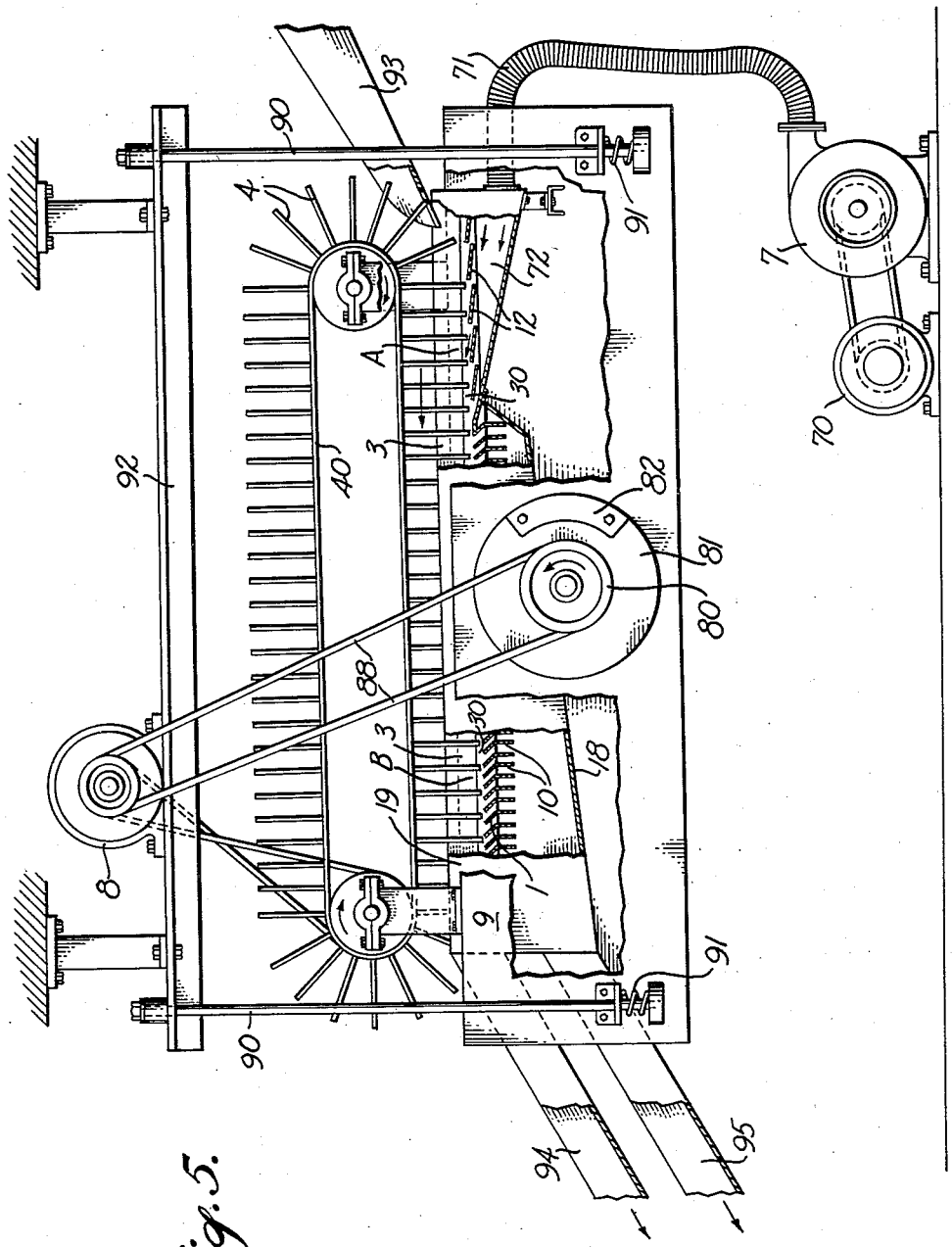
Figure 5 is a view generally comparable with Figure 1, illustrating diagrammatically a positive feed form.

The machine shown in Figure 5 is much the same as that already described. Principally it differs in that the feed is a positive one, advancing the mass and the separated stems positively along a horizontal screen. Only the screening of the raisins depends upon gravity. The admixed mass fed by the feed chute 93 is engaged by tines 4 of an endless belt 40, arranged to travel the length of the screen. The tines may extend down close to the bottom of the screen. Their function is merely to advance the mass and stems, while they are being shaken loose and rearranged by the vibration. They do not materially assist in this loosening or rearrangement. They can be of a length to advance raisins which fall upon the substantially imperforate bottom area A, although ordinarily the stems will brush the raisins along until they can drop through the louvered bottom area B.

In operation, it will be understood, the mixture of stems and raisins is advanced in a given direction, by gravity, by air jets, positively, or otherwise, or by two or more such forces combined, along transversely and narrowly spaced ridge edges elevated above a screen bottom, meanwhile agitating the mass. Thereby the mass is gradually shaken apart so that the individual stems can drop down between the ridges, and because of their length relative to the spacing between ridges, and the brushing they receive in area A, become channelized therein to lie in the general direction of the ridges, and the raisins can drop out quite freely onto the screen bottom. The raisins are removed by permitting them to drop through the louver apertures in the screen bottom, with their reversely inclined surfaces, whereas the longer and somewhat interhooked stems can not detach themselves from the mass, to move reversely through the louver spaces, even were they straight enough to do so, and their longitudinal disposition, crookedness, length, and tendency to interhook, and so to move with the channelized mass of stems, in relation to the size and disposition of the louver openings, prevents any such escape of stems other than very short ones.

Such a screen, sixteen inches in width and three feet long, has been operated experimentally at a rate to handle 1300 pounds of mixture in an hour, and it is expected that a screen twenty-four inches wide will handle a ton an hour, day after day. Duplicate screens may be employed in a single machine, and will thus equal the capacity of a specific commercial raisin-packing plant in its allied aspects.

I claim as my invention:

1. A machine for separating loose raisins from stems with which they are admixed, comprising a screen whereon to support and along which to advance such a mixture in a given direction, formed with a bottom area which has apertures of a size only sufficiently large to pass the raisins, parallel ridges upstanding from said bottom area and extending in the direction of advance, and spaced across the screen by distances appreciably less than the length of the majority of stems, means to deposit a tangled mixture of stems and raisins upon the ridges, to be supported thereby above the screen, and means to vibrate the screen in a direction generally normal to its plane, as the mixture advances along the ridges and the screen.

2. A machine for separating loose raisins from stems with which they are admixed, comprising a screen whereon to support and along which to advance such a mixture in a given direction, a plurality of parallel louvers defining a bottom area of said screen, spaced apart in the direction of advance only sufficiently to pass raisins between them, and inclined oppositely to the direction of advance, means above and extending in the direction of advance, and spaced apart transversely by distances appreciably less than the length of the majority of stems, to align the admixed stems generally in that same direction as they pass over such louvered bottom area, means to deposit a tangled mixture of stems and raisins upon said aligning means, above the screen, and means to agitate the mixture in a substantially vertical direction as it advances towards the discharge end of the screen.

3. A machine of the character defined in claim 1, wherein the ridges are in part higher and in part lower, the higher ridges being spaced apart by distances appreciably less than the length of the majority of stems, and the lower ridges being located intermediate the higher ridges, and each being spaced from adjacent ridges by distances less than the length of most of the short stems.

4. A machine as set forth in claim 3, wherein the higher and lower ridges alternate, the lower ridges being spaced midway between the two adjacent higher ridges.

5. A machine of the character defined in claim 1, wherein the ridges, in part at least, are of a height above the bottom area to locate their upper edges at a distance above such bottom area which approaches the length of the longest stems.

6. A machine for separating loose raisins from stems with which they are admixed, comprising an inclined screen whereon to support and along which to advance such a mixture in a given direction, parallel louvers directed transversely of the direction of inclination, defining a bottom area of said screen, and spaced apart in the direction of inclination only sufficiently to pass raisins between them, ridges upstanding from said bottom area in upright parallel planes, extending in the direction of advance, and spaced apart by distances appreciably less than the length of the majority of stems, means to deposit a tangled mass of stems upon the upper end of the ridges, and means to vibrate the screen in a direction generally normal to its plane.

7. A machine of the character defined in claim 6, wherein the louvers are inclined oppositely to the direction of advance.

8. A machine of the character defined in claim 6, wherein the louvers are formed with an upper portion which is inclined oppositely to the direction of advance, and a lower portion which is disposed generally normally to the general plane of the screen.

9. A machine for separating raisins from stems with which they are admixed, comprising a screen whereon to support and along which to advance such a mixture in a given direction, formed with an initially encountered and a subsequently encountered bottom area, respectively, the subsequently encountered bottom area having apertures of a size only large enough to pass the raisins, and the initially encountered bottom area constituting a floor to engage and deflect stems directed towards that floor, and formed with jet apertures directed in the direction of advance, means to direct air jets through such apertures, ridges upstanding from the bottom areas of the screen, extending in upright parallel planes at spacings appreciably less than the length of the majority of stems, means to deposit a tangled mass of stems and raisins upon the ridges at one end thereof, and means to agitate the mixture as it advances along the ridges and the screen.

References Cited in the file of this patent

UNITED STATES PATENTS

| Re. 2,155 | Mills | Jan. 23, 1866 |
| 4,600 | Church | June 27, 1846 |
| 24,704 | Rollow | July 5, 1854 |
| 790,704 | Osborne | May 23, 1905 |
| 1,820,055 | Divoky | Aug. 25, 1931 |
| 2,420,941 | Fies | May 20, 1947 |
| 2,620,064 | Thys | Dec. 2, 1952 |

FOREIGN PATENTS

| 374,732 | Germany | Feb. 2, 1922 |